(12) United States Patent
Zhu et al.

(10) Patent No.: US 11,310,404 B2
(45) Date of Patent: Apr. 19, 2022

(54) IMAGING DEVICE, CONTROL METHOD FOR IMAGING DEVICE, ELECTRONIC APPARATUS AND NON-TRANSITORY READABLE MEDIUM COMPRISING FIRST AND SECOND VOLTAGE SIGNALS APPLIED TO A LIQUID CRYSTAL LENS ASSEMBLY TO ADJUST THE FOCAL POSITION OF A FIRST AND SECOND LINEARLY POLARIZED LIGHT

(71) Applicants: BOE Technology Group Co., Ltd., Beijing (CN); University of Electronic Science and Technology of China, Chengdu (CN)

(72) Inventors: Xuehui Zhu, Beijing (CN); Xiaoxi Chen, Beijing (CN); Junrui Zhang, Beijing (CN); Mao Ye, Beijing (CN); Lijia Zhou, Beijing (CN); Zhidong Wang, Beijing (CN); Shuang Du, Beijing (CN)

(73) Assignees: BOE Technology Group Co., Ltd., Beijing (CN); University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 17/263,878

(22) PCT Filed: Jun. 5, 2020

(86) PCT No.: PCT/CN2020/094748
§ 371 (c)(1),
(2) Date: Jan. 27, 2021

(87) PCT Pub. No.: WO2020/253557
PCT Pub. Date: Dec. 24, 2020

(65) Prior Publication Data
US 2021/0321026 A1 Oct. 14, 2021

(30) Foreign Application Priority Data

Jun. 20, 2019 (CN) .......................... 201910539070.7

(51) Int. Cl.
*H04N 5/232* (2006.01)
*H04N 5/225* (2006.01)
*G02F 1/29* (2006.01)

(52) U.S. Cl.
CPC .......... *H04N 5/2254* (2013.01); *G02F 1/294* (2021.01); *H04N 5/2253* (2013.01); *H04N 5/23212* (2013.01)

(58) Field of Classification Search
CPC ............................ G02F 1/294; H04N 5/23212
See application file for complete search history.

(56) References Cited

U.S. PATENT DOCUMENTS

| | | | | |
|---|---|---|---|---|
| 6,250,550 | B1 * | 6/2001 | Winarski | G06K 7/10574 235/383 |
| 2003/0048394 | A1 * | 3/2003 | Okuwaki | G02F 1/29 349/5 |

(Continued)

FOREIGN PATENT DOCUMENTS

| | | |
|---|---|---|
| CN | 101068060 A | 11/2007 |
| CN | 102645814 A | 8/2012 |

(Continued)

OTHER PUBLICATIONS

Chen, Xiaoxi, et al. "Driving method for liquid crystal lens to increase focus range." Electronics Letters 55.6 (2019): 336-337.
CN201910539070.7 First Office Action.

*Primary Examiner* — Gary C Vieaux
(74) *Attorney, Agent, or Firm* — IPro, PLLC

(57) ABSTRACT

An imaging device, an imaging control method, an electronic apparatus, and a readable medium. The imaging device comprises: an image sensing assembly; a liquid crystal lens assembly provided with light control components corresponding to an image sensing component, wherein each of the light control components comprises a first liquid crystal component and a second liquid crystal (Continued)

component, which are arranged opposite each other, and the orientation of liquid crystal molecules in the first liquid crystal component is perpendicular to the orientation of liquid crystal molecules in the second liquid crystal component; and a processing assembly, wherein the processing assembly is respectively electrically connected to the image sensing assembly and the liquid crystal lens assembly, and is configured to adjust, according to a light receiving amount measured by the image sensing assembly, the voltage applied to the light control component.

19 Claims, 6 Drawing Sheets

(56) References Cited

U.S. PATENT DOCUMENTS

| | | | | |
|---|---|---|---|---|
| 2007/0139333 | A1* | 6/2007 | Sato | G02F 1/134309 345/90 |
| 2012/0300167 | A1 | 11/2012 | You et al. | |
| 2014/0028924 | A1* | 1/2014 | Yamaguchi | G03B 17/565 349/1 |
| 2015/0189173 | A1 | 7/2015 | Ye et al. | |
| 2015/0189174 | A1 | 7/2015 | Bao et al. | |
| 2015/0268495 | A1* | 9/2015 | Kizaki | G02F 1/133784 349/33 |
| 2018/0173056 | A1* | 6/2018 | Lin | G02F 1/133504 |
| 2018/0220057 | A1 | 8/2018 | Wang et al. | |
| 2020/0077018 | A1 | 3/2020 | Yan et al. | |

FOREIGN PATENT DOCUMENTS

| | | |
|---|---|---|
| CN | 103700678 A | 4/2014 |
| CN | 103728808 A | 4/2014 |
| CN | 103728809 A | 4/2014 |
| CN | 105827922 A | 8/2016 |
| CN | 106168727 A | 11/2016 |
| CN | 109116658 A | 1/2019 |
| CN | 110166676 A | 8/2019 |
| JP | 2007108426 A | 4/2007 |

* cited by examiner

IMAGING DEVICE, CONTROL METHOD FOR IMAGING DEVICE, ELECTRONIC APPARATUS AND NON-TRANSITORY READABLE MEDIUM COMPRISING FIRST AND SECOND VOLTAGE SIGNALS APPLIED TO A LIQUID CRYSTAL LENS ASSEMBLY TO ADJUST THE FOCAL POSITION OF A FIRST AND SECOND LINEARLY POLARIZED LIGHT

CROSS-REFERENCES TO RELATED DISCLOSURE

The present disclosure is a National Stage of International Application No. PCT/CN2020/094748, filed on Jun. 5, 2020, which claims the priority to Chinese Patent Application No. 201910539070.7, filed with the China National Intellectual Property Administration on Jun. 20, 2019, the content of which are incorporated herein by reference in their entirety.

FIELD

The present disclosure relates to the field of imaging technology, in particular to an imaging device, an imaging control method, an electronic apparatus and a readable medium.

BACKGROUND

Modern people's lives love to take pictures to record their lives, and photography is increasingly valued as a profession or as an interest. In the related art, a user uses an imaging device to take pictures. The imaging device includes an image sensor and a liquid crystal lens, and the liquid crystal lens is configured to focus light onto the image sensor.

According to the research of the applicant, it is found that the light efficiency of the image sensor in the imaging device in the related art is easily saturated, which in turn reduces the dynamic range of the image sensor, thereby affecting the imaging effect of the pictures.

SUMMARY

The present disclosure provides an imaging device, including:
  an image sensor assembly, including a plurality of image sensor components distributed in an array;
  an liquid crystal lens assembly, located on a light incident side of the image sensor assembly, and provided with light control components corresponding to the image sensor components; wherein each of the light control components includes: a first liquid crystal component and a second liquid crystal component which are disposed oppositely with each other, and the orientation of the liquid crystal molecules in the first liquid crystal component and the orientation of the liquid crystal molecules in the second liquid crystal component are perpendicular to each other; and
  a processing assembly, electrically connected with both the image sensor assembly and the liquid crystal lens assembly and configured to adjust a voltage applied to the light control components according to an amount of light received detected by the image sensor components so that the light control components adjust a focal position of emitted light to change a distance between the focal position and the image sensor components.

In a possible implementation manner, the first liquid crystal component includes: first substrate, a second substrate opposite to the first substrate, a first control electrode located on a side of the first substrate facing the second substrate, and a first common electrode located on a side of the second substrate facing the first substrate; and
  the second liquid crystal component includes: a third substrate, a fourth substrate, a second control electrode located on a side of the third substrate facing the fourth substrate, and a second common electrode located on a side of the fourth substrate facing the third substrate.

In a possible implementation manner, an orthographic projection of the first control electrode on the first substrate coincides with an orthographic projection of the second control electrode on the first substrate.

In a possible implementation manner, each of the image sensor components includes a fifth substrate, a photosensitive part located on the fifth substrate, and a peripheral part surrounding the photosensitive part; and
  the orthographic projection of the first control electrode on the first substrate covers an orthographic projection of the photosensitive part on the first substrate.

In a possible implementation manner, the processing assembly is a central processing unit, a field-programmable gate array, a digital signal processor, or a microcontroller unit.

Some embodiment of the present disclosure further provide a control method for the imaging device as provided in the embodiment of the present disclosure, wherein the method includes:
  obtaining an amount of light received detected by the image sensor components; and
  adjusting a voltage applied to the light control components so that the light control components adjust a focal position of emitted light to change a distance between the focal position and the image sensor components.

In a possible implementation manner, the adjusting the voltage applied to the light control components so that the light control components adjust the focal position of the emitted light includes:
  determining whether the total amount of light received in a threshold time period is less than a threshold value;
  generating a first voltage signal and a second voltage signal in the condition that it is determined that the total amount of light received is less than the threshold value; and
  applying the first voltage signal to the first liquid crystal components to adjust the focal position of a first light to the photosensitive parts, and applying the second voltage signal to the second liquid crystal components to adjust the focal position of a second light to the photosensitive parts, wherein the first light and the second light are two linearly polarized lights which are converted from external ambient light passing through liquid crystal molecules and the polarization direction of the first light and polarization direction of the second light are perpendicular to each other.

In a possible implementation manner, the adjusting the voltage applied to the light control components so that the light control components adjust the focal position of the emitted light further includes:
  generating a third voltage signal in the condition that it is determined that the total amount of light received is greater or equal to the threshold value; and
  applying the third voltage signal to the first liquid crystal components so that the focal position of the first light is at a first set position, wherein a distance between the first set position and the image sensor components is less than or greater than a distance between the light control components and the image sensor components.

In a possible implementation manner, the adjusting the voltage applied to the light control components so that the light control components adjust the focal position of the emitted light further includes:

generating a fourth voltage signal in the condition that it is determined that the total amount of light received is greater or equal to the threshold value; and applying the fourth voltage signal to the second liquid crystal components so that the focal position of the second light is at a second set position, wherein a distance between the second set position and the image sensor components is less than or greater than the distance between the light control components and the image sensor components.

In a possible implementation manner, the adjusting the voltage applied to the light control components so that the light control components adjust the focal position of the emitted light further includes:

generating a third voltage signal and a fourth voltage signal in the condition that it is determined that the total amount of light received is greater or equal to the threshold value; and applying the third voltage signal to the first liquid crystal components and applying the fourth voltage signal to the second liquid crystal components so that the focal position of the first light is at a first set position and the focal position of the second light is at a second set position, wherein a distance between the first set position and the image sensor components is less than or greater than a distance between the light control components and the image sensor components, and a distance between the second set position and the image sensor components is less than or greater than the distance between the light control components and the image sensor components.

In a possible implementation manner, before obtaining the amount of light received detected by the image sensor components, the method further includes:

adjusting a voltage applied to the light control components so that the focal position of emitted light of the light control components is located at the photosensitive parts of the image sensor components.

Some embodiments of the present disclosure further provide an electronic apparatus, comprising the imaging device as provided in the embodiments of the present disclosure.

Some embodiments of the present disclosure further provide a readable medium, wherein a computer program that can be run on a processor is stored thereon, and the computer program is executed by the processor to implement steps of the imaging control method as provided by the embodiments of the present disclosure.

Other features and advantages of the present disclosure will be described hereinafter, and partly become obvious from the specification or be understood by implementing the present disclosure. Other advantages of the present disclosure can be realized and obtained through the solutions described in the specification, claims and drawings.

BRIEF DESCRIPTION OF THE DRAWINGS

The accompanying drawings are used to provide an understanding of the technical solutions of the present disclosure, and constitute a part of the specification. The accompanying drawings are configured to explain the technical solutions of the present disclosure together with the embodiments of the present disclosure, and do not constitute a limitation to the technical solutions of the present disclosure.

DETAILED DESCRIPTION OF THE EMBODIMENTS

Figure 1:
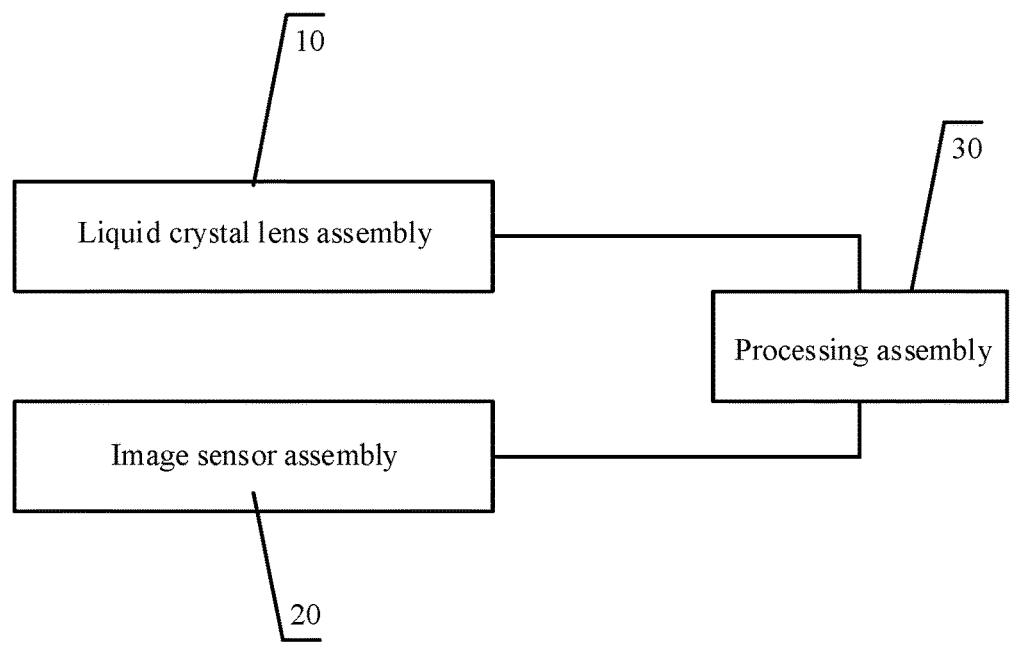
FIG. 1 is structural diagram 1 of an imaging device provided by an embodiment of the present disclosure.

The present disclosure illustrates a number of embodiments, but the description is exemplary rather than restrictive, and it is obvious to a person of ordinary skill in the art that there may be more embodiments and implementation solutions within the scope of the embodiments described in the present disclosure. Although many possible combinations of features are shown in the drawings and discussed in the specific embodiments, many other combinations of the disclosed features are also possible. Unless specifically defined, any feature or element of any embodiment can be used in combination with any other feature or element in any other embodiment, or can replace any other feature or element in any other embodiment.

The present disclosure includes and contemplates combinations with features and elements known to those of ordinary skill in the art. The embodiments, features, and elements disclosed in the present disclosure can also be combined with any conventional features or elements to form a unique disclosure solution defined by the claims. Any feature or element of any embodiment can also be combined with features or elements from other disclosures to form another unique disclosure defined by the claims. Therefore, it should be understood that any feature shown and/or discussed in the present disclosure can be implemented individually or in any suitable combination. Therefore, the embodiments are not restricted except for the restrictions made according to the appended claims and their equivalents. In addition, various modifications and changes can be made within the protection scope of the appended claims.

In addition, in the condition that describing representative embodiments, the specification may have presented the method and/or process as a specific sequence of steps. However, to the extent that the method or process does not depend on the specific sequence of the steps described herein, the method or process should not be limited to the steps in the specific sequence described. As those of ordinary skill in the art will understand, the steps in other sequences are also possible. Therefore, the specific sequence of steps set forth in the specification should not be construed as a limitation on the claims. In addition, the claims for the method and/or process should not be limited to performing their steps in the described sequences. Those skilled in the art can easily understand that these sequences can be changed and still remain within the spirit and scope of the embodiments of the present disclosure.

Unless otherwise defined, the technical terms or scientific terms disclosed in the embodiments of the present disclosure shall have the usual meanings understood by those of ordinary skills in the field to which the present disclosure belongs. The "first", "second" and similar words used in the embodiments of the present disclosure do not indicate any order, quantity or importance, but are only used to distinguish different components. "Include" or "including" and other similar words mean that the element or item appearing before the word encompasses elements or items listed after the word and their equivalents, but does not exclude other elements or items. "connection" or "connected" and other similar words are not limited to physical or mechanical connections, but may include electrical connections, whether direct or indirect. Words, such as "up," "down," "left," and "right", are only configured to indicate relative positional relationships. When the absolute position of the described object changes, the relative positional relationship may also change accordingly.

Figure 2A:
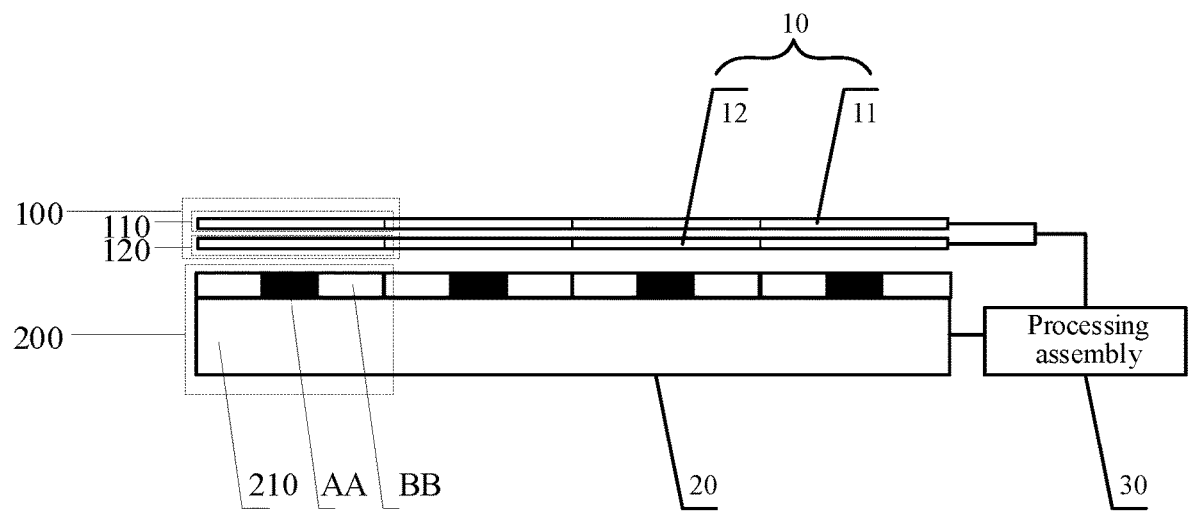
FIG. 2A is structural diagram 2 of an imaging device provided by an embodiment of the present disclosure.

Some embodiments of the present disclosure provide an imaging device. FIG. 1 is structural diagram 1 of an imaging device provided by an embodiment of the present disclosure. As shown in FIG. 1 and FIG. 2A, the imaging device provided by the embodiment of the present disclosure includes:

an image sensor assembly 20, including a plurality of image sensor components 200 distributed in an array, wherein specifically, the image sensor components 200 can collect the amount of light received at each moment;

a liquid crystal lens assembly 10, located on a light incident side of the image sensor assembly 20 and provided with light control components 100 corresponding to the image sensor components 200, that is, the liquid crystal lens assembly 10 having a plurality of light control components 100, the light control components 100 corresponding to the image sensor components 200 in a one-to-one correspondence, wherein each light control component 100 includes: a first liquid crystal component 110 and a second liquid crystal component 120 disposed oppositely, and the first liquid crystal component 110 and the second liquid crystal component 120 each comprises: liquid crystal molecules, wherein the orientation of the liquid crystal molecules in the first liquid crystal component 110 and the orientation of the liquid crystal molecules in the second liquid crystal component 120 are perpendicular to each other; specifically, the second liquid crystal component 120 can be located on a side of the first liquid crystal component 110 proximate to the image sensor assembly 20; and a processing component 30, electrically connected with both the image sensor assembly 20 and the liquid crystal lens assembly 10 and configured to adjust a voltage applied to the light control components 100 according to an amount of light received detected by the image sensor components 200 so that the light control components 100 adjust a focal position of emitted light to change a distance between the focal position and the image sensor components 200. The processing component 30 can be specifically used to obtain the total amount of light received by the image sensor assembly 20 within a threshold time period according to the amount of light received by the image sensor assembly 20 at each moment, obtain a voltage signal according to the total amount of light received, and apply the voltage signal to the liquid crystal lens assembly 10 to adjust the focal position of the light emitted by the liquid crystal lens assembly 10.

Optionally, the image sensor assembly 20 includes: complementary metal oxide semiconductor (CMOS) image sensors or charge coupled device (CCD) image sensors.

Optionally, the processing assembly 30 may be implemented by a processor that performs logical operations, such as a central processing unit (CPU), a field-programmable gate array (FPGA), a digital signal processor (DSP), a microcontroller unit (MCU) and other devices with data processing capabilities and/or program execution capabilities.

In specific implementation, usually the plane in which the liquid crystal lens assembly 10 is disposed can be parallel to the plane in which the image sensor assembly 20 is disposed, which can simplify the imaging light path of the liquid crystal lens assembly, or, if necessary, the plane in which the liquid crystal lens assembly 10 is disposed can be inclined a certain preset angle to the plane in which the image sensor assembly 20 is disposed, which is not defined herein.

Specifically, in the embodiments of the present disclosure, when the focal position of the light emitted by the liquid crystal lens assembly 10 is adjusted, the light efficiency of the image sensor assembly 20 will also change accordingly, and the dynamic range of the image sensor assembly 20 can be changed. That is, if the external light is weak, the light emitted through the liquid crystal lens assembly can be adjusted to focus on the photosensitive parts of the image sensor assembly 20, and the light from the liquid crystal lens assembly can be effectively used to improve the imaging quality when the external light is weak. If the external light is strong, the light coming out of the liquid crystal lens assembly can be adjusted to focus on the photosensitive parts of the image sensor assembly 20 to avoid overexposure and improve the imaging quality when the external light is strong; thus, the imaging device can have a wider applicable range for external light intensity and at the same time have better imaging quality.

Optionally, the threshold time period may be any time range, which is not limited in the embodiments of the present disclosure, and is specifically determined according to actual conditions.

The imaging device provided by the embodiment of the present disclosure includes: a liquid crystal lens assembly, an image sensor assembly, and a processing assembly. The image sensor assembly is located on the light exit side of the liquid crystal lens assembly; the image sensor assembly is configured to collect the amount of light received at each moment; the processing assembly is connected with both the image sensor assembly and the liquid crystal lens assembly, is configured to obtain the total amount of light received by the image sensor assembly within a threshold time period according to the amount of light received by the image sensor assembly at each moment, obtain a voltage signal according to the total amount of light received, and apply the voltage signal to the liquid crystal lens assembly to adjust the focal position of the light emitted by the liquid crystal lens assembly. According to the present disclosure, by providing the processing assembly to adjust the focal position of the light emitted by the liquid crystal lens assembly according to the total amount of light received by the image sensing assembly, the light efficiency of the image sensing assembly is adjusted, and then the dynamic range of the image sensor assembly can be adjusted by adjusting the light efficiency of the image sensor assembly, thereby improving the imaging effect of pictures.

Optionally, FIG. 2A is structural diagram 2 of the imaging device provided by an embodiment of the present disclosure. As shown in FIG. 2A, the liquid crystal lens assembly 10 in the imaging device provided by the embodiment of the present disclosure includes: a first liquid crystal lens array 11 and a second liquid crystal lens array 12, wherein the first liquid crystal components 110 are located in the first liquid crystal lens array 11, and the second liquid crystal components 120 are located in the second liquid crystal lens array 12.

Wherein, the second liquid crystal lens array 12 is located on a side of the first liquid crystal lens array 11 proximate to the image sensor assembly 20, and the orientation of the liquid crystal molecules of the first liquid crystal lens array 11 is perpendicular to and the orientation of liquid crystal molecules of the second liquid crystal lens array 12.

In specific implementation, the light entering the liquid crystal lens assembly 10 first passes through the first liquid crystal component 110 and then passes through the second liquid crystal component 120, and the light emitted from the second liquid crystal component 120 enters the image sensor assembly 20.

Optionally, the first liquid crystal component 11 and the second liquid crystal component 12 may be sub liquid crystal lenses. Each sub liquid crystal lens includes: a first transparent electrode, a second transparent electrode, and a liquid crystal layer disposed between the first transparent electrode and the second transparent electrode. The processing assembly applies a voltage signal between the first transparent electrode and the second transparent electrode of each sub liquid crystal lens to deflect the liquid crystal molecules located between the first transparent electrode and the second transparent electrode, so that the curvature of each sub liquid crystal lens changes, thereby adjusting the focal position of the light emitted from the transparent liquid crystal assembly.

In specific implementation, the first liquid crystal component 110 may include: a first substrate 111, a second substrate 112 opposite to first substrate 111, a first control electrode 115 located on a side of the first substrate 111 facing the second substrate 112, and a first common electrode 116 located on a side of the second substrate 111 facing the first substrate 111; the second liquid crystal component 120 includes: a third substrate 113, a fourth substrate 114 opposite to the third substrate 113, a second control electrode 117 on a side of the third substrate 113 facing the fourth substrate 114, and a second common electrode 118 on a side of the fourth substrate 114 facing the third substrate 113. In specific implementation, the first substrate 111 may be located on a side of the second substrate 112 facing the image sensor assembly 20, and the third substrate 113 may be located on the side of the fourth substrate 114 facing the image sensor assembly 20. The first substrates 111 of the first liquid crystal components 110 are in an integrated structure, the second substrates 112 of the first liquid crystal components 110 are in an integrated structure, the first control electrodes 115 of the first liquid crystal components 110 are electrodes spaced from each other, and the first common electrodes 116 of the first liquid crystal components 110 are in an integral structure. The third substrates 113 of the second liquid crystal components 120 are in an integrated structure, the fourth substrates 114 of the second liquid crystal components 120 are in an integrated structure, the second control electrodes 117 of the second liquid crystal components 120 are electrodes spaced from each other, and the second common electrodes 118 of the second liquid crystal components 120 are in an integral structure.

In specific implementation, the orthographic projection of the first control electrode 115 on the first substrate 111 coincides with the orthographic projection of the second control electrode 116 on the first substrate 111.

Figure 2B:
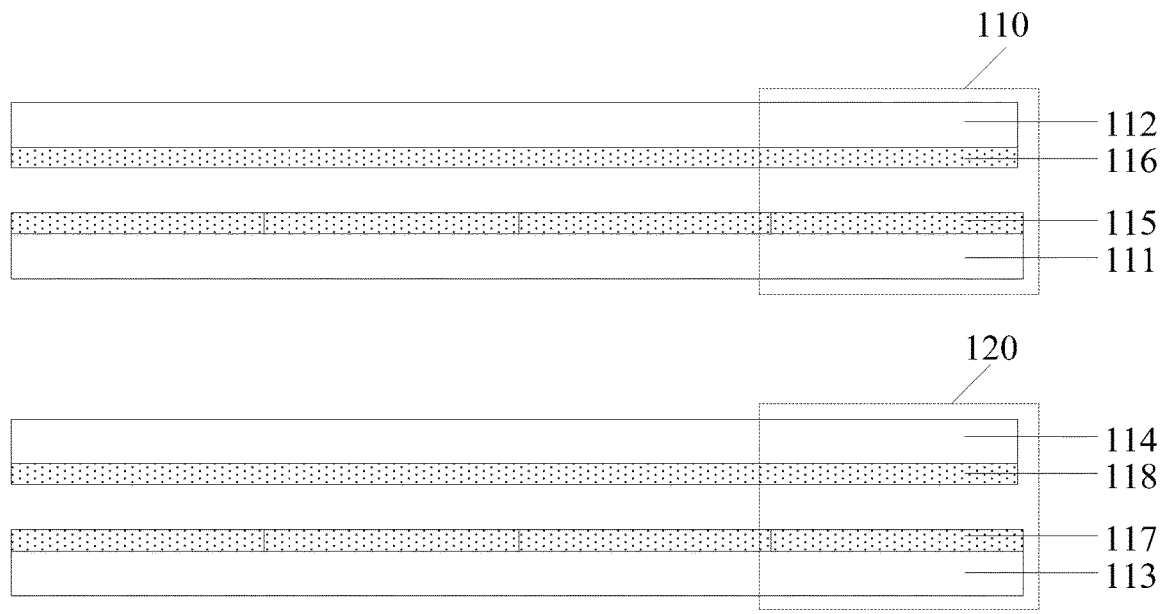
FIG. 2B is a cross-sectional view of a specific structure of a liquid crystal lens assembly provided by an embodiment of the present disclosure.

In specific implementation, as shown in FIGS. 2A and 2B, each image sensor component 200 includes a fifth substrate 210, a photosensitive part AA located on the fifth substrate 210, and a peripheral part BB surrounding the photosensitive part AA; the orthographic projection of the first control electrode 115 on the first substrate 111 covers the orthographic projection of the photosensitive part AA on the first substrate 111.

Optionally, in a specific implementation, in the imaging device provided by the embodiments of the present disclosure, the area occupied by each sub-liquid crystal lens constituting the first liquid crystal components and the second liquid crystal components may be the same or different. Each sub liquid crystal lens occupies the same area, which is convenient for editing the applied voltage signal to the sub electrode corresponding to each sub-liquid crystal lens, and this will not be limited in the embodiment of the present disclosure.

Optionally, as shown in FIG. 2A, the processing assembly 30 in the imaging device provided by the embodiment of the present disclosure is electrically connected to both the first liquid crystal lens array 11 and the second liquid crystal lens array 12, and is configured to apply a voltage signal on the first liquid crystal components 110 and/or the second liquid crystal components 120.

In specific implementation, when light passes through the first liquid crystal components 110, it is divided into a first light and a second light. In specific implementation, the first light may be an extraordinary light (e-light), and the second light may be an ordinary light (o-light), wherein the focal position of the extraordinary light generated after the light passes through the first liquid crystal components 110 can be adjusted by the voltage signal applied to the first liquid crystal components 110; since the orientation of the liquid crystal molecules of the second liquid crystal components 120 is perpendicular to that of the first liquid crystal components 110, the ordinary light emitted from the first liquid crystal components 110 forms extraordinary light after passing through the second liquid crystal components 120; wherein, the focal position of the ordinary light generated after the light passes through the first liquid crystal components 110 can be adjusted by the voltage signal applied to the second liquid crystal components 120, so that the focal position of the light emitted from the liquid crystal lens arrays can be adjusted arbitrarily through two liquid crystal lens array layers in which the orientations of the liquid crystal molecules in different layers are perpendicular to each other.

Figure 3:
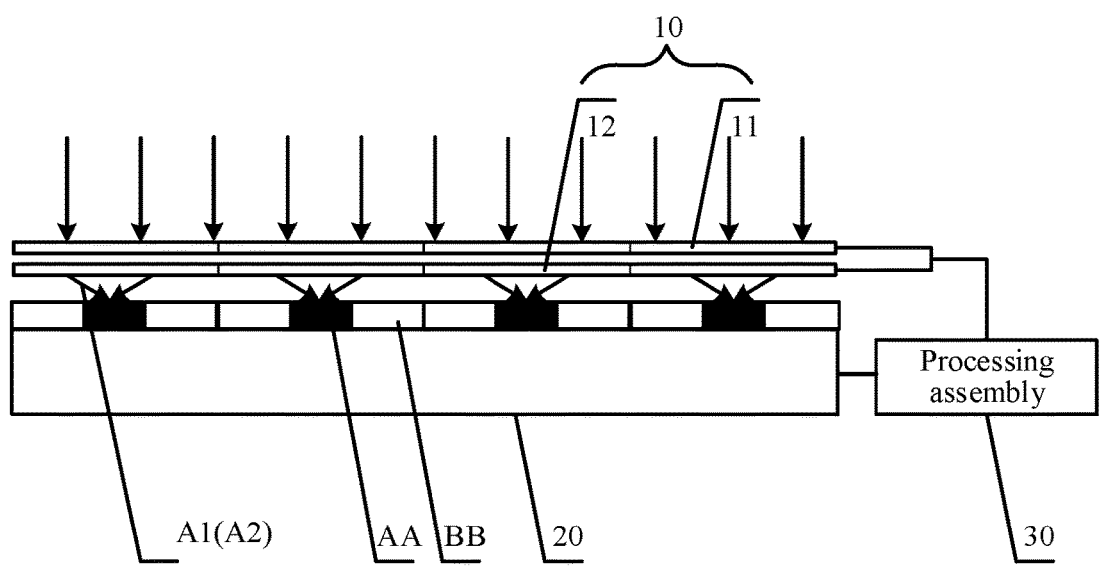
FIG. 3 is light path diagram 1 of the imaging device provided by an embodiment of the present disclosure.
Figure 4:
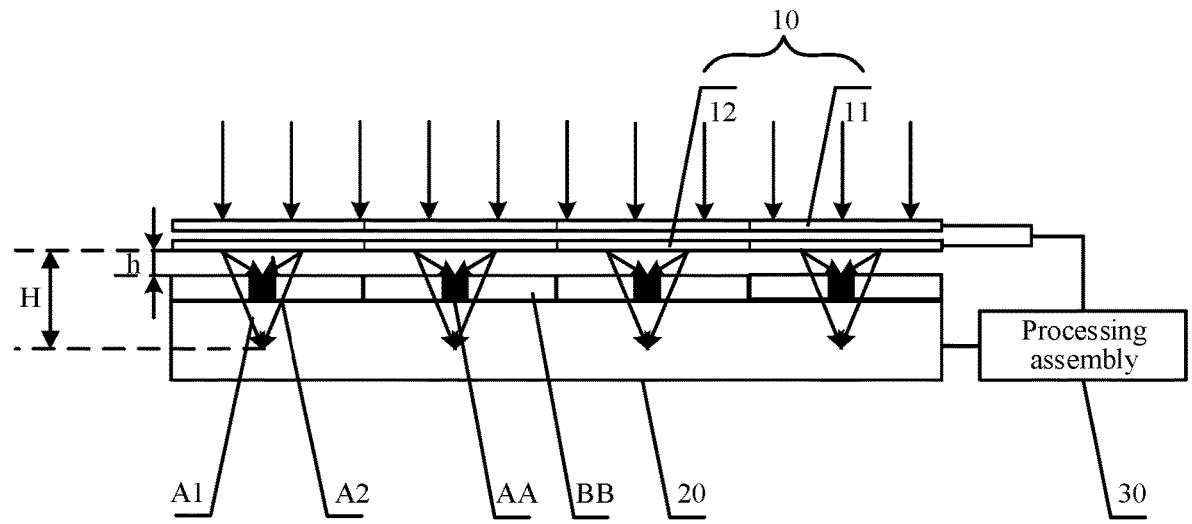
FIG. 4 is light path diagram 2 of the imaging device provided by an embodiment of the present disclosure.
Figure 5:
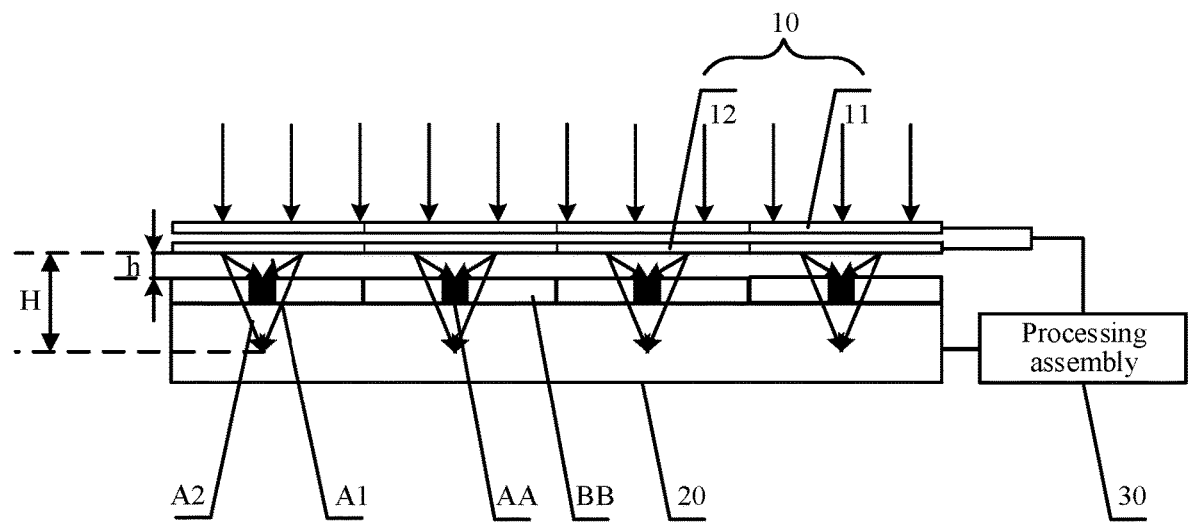
FIG. 5 is light path diagram 3 of the imaging device provided by an embodiment of the present disclosure.
Figure 6:
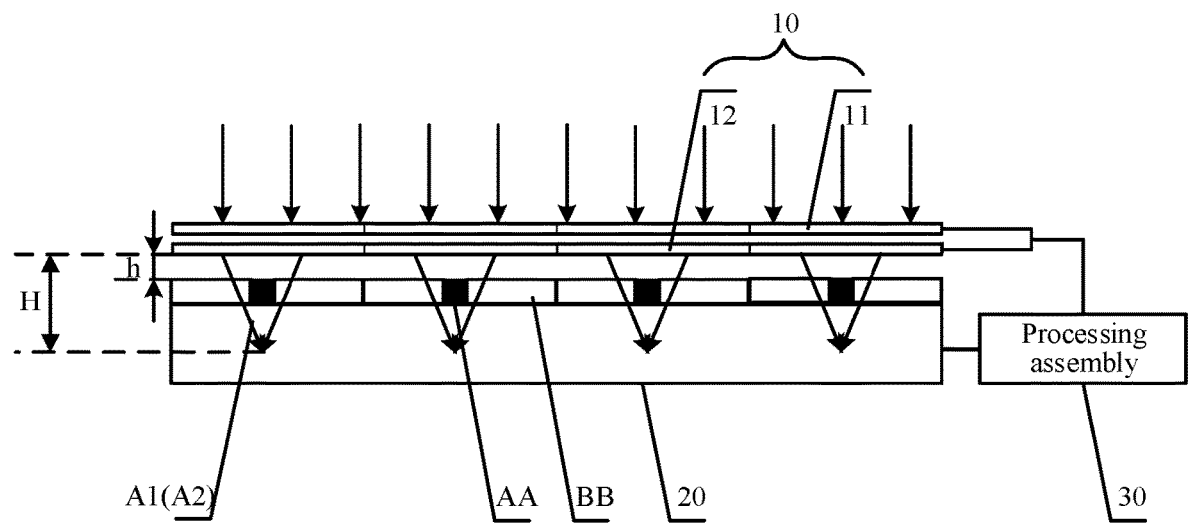
FIG. 6 is light path diagram 4 of the imaging device provided by an embodiment of the present disclosure.
Figure 7:
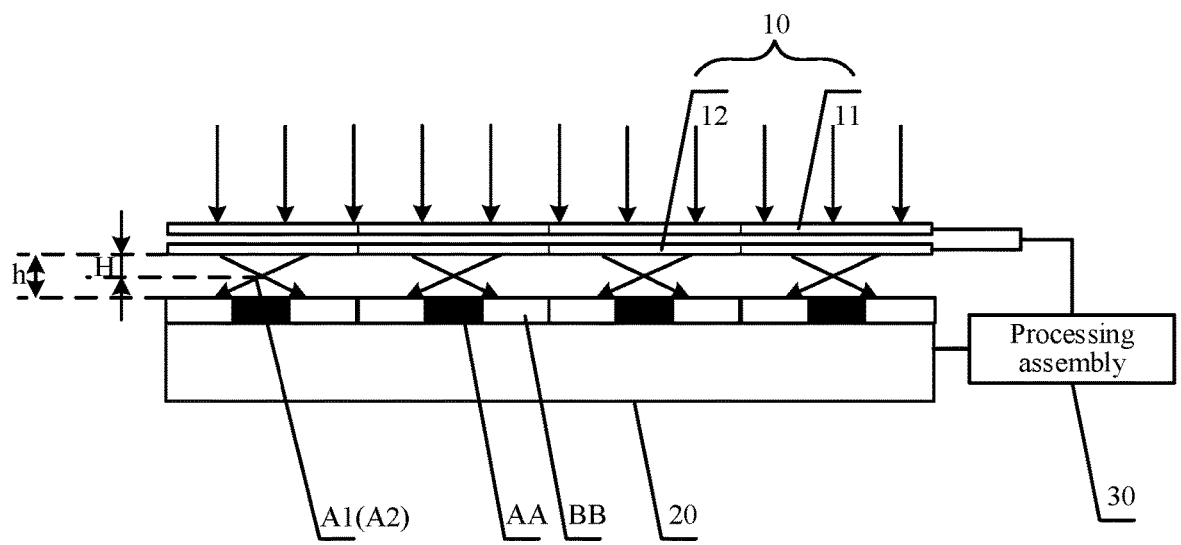
FIG. 7 is light path diagram 5 of the imaging device provided by an embodiment of the present disclosure.

Optionally, FIG. 3 is light path diagram 1 of the imaging device provided by an embodiment of the present disclosure, FIG. 4 is light path diagram 2 of the imaging device provided by an embodiment of the present disclosure, FIG. 5 is light path diagram 3 of the imaging device provided by an embodiment of the present disclosure, FIG. 6 is light path diagram 4 of the imaging device provided by an embodiment of the present disclosure, FIG. 7 is light path diagram

Figure 8:
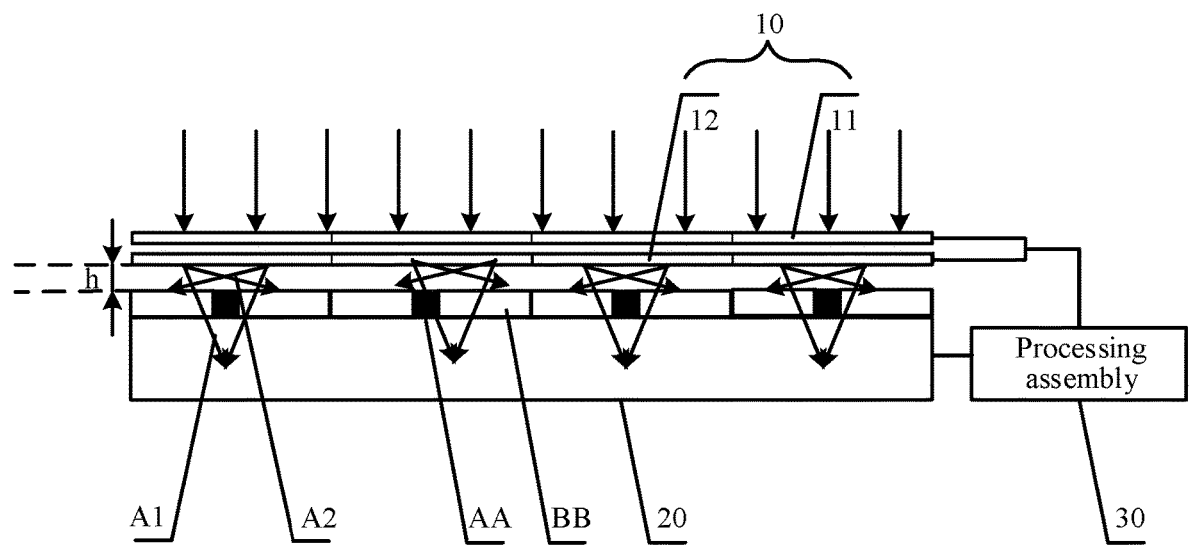
FIG. 8 is light path diagram 6 of the imaging device provided by an embodiment of the present disclosure.
Figure 9:
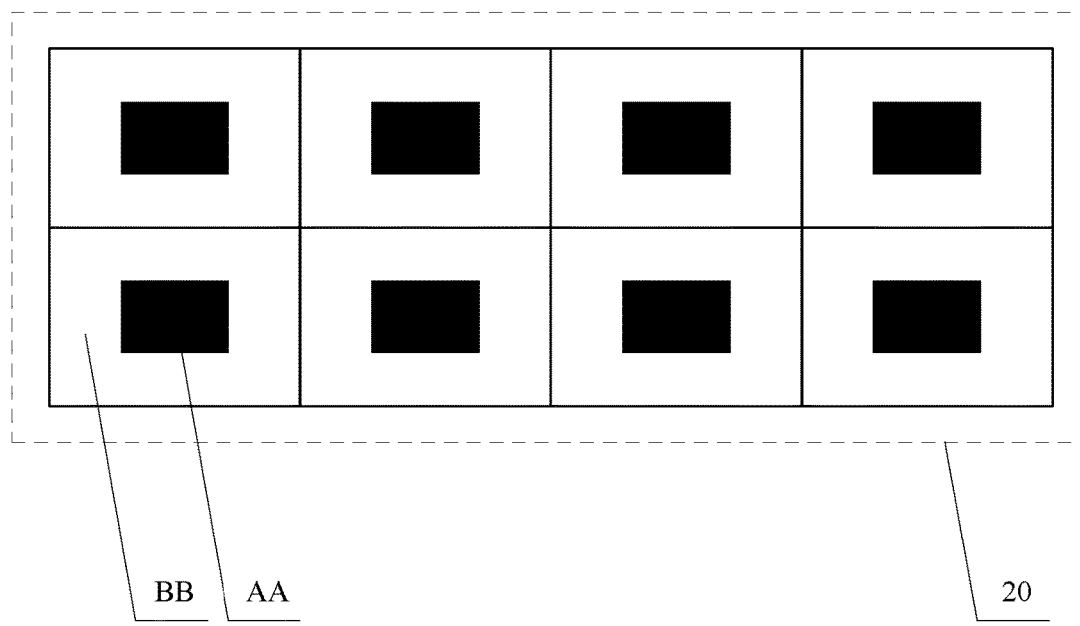
FIG. 9 is a top view of an image sensor assembly provided by an embodiment of the present disclosure.

5 of the imaging device provided by an embodiment of the present disclosure, FIG. 8 is light path diagram 6 of the imaging device provided by an embodiment of the present disclosure, and FIG. 9 is a top view of the image sensor assembly provided by an embodiment of the present disclosure. As shown in FIGS. 3 to 9, the light emitted by the liquid crystal lens assembly in the imaging device provided by the embodiment of the present disclosure includes: a first light A1 and a second light A2; the image sensor assembly 20 in the imaging device provided by the embodiment of the present disclosure includes: a photosensitive part AA and a peripheral part BB surrounding the photosensitive part AA.

The first light A1 is extraordinary light, and the second light A2 is ordinary light.

In specific implementation, the processing assembly 30 is specifically configured to: determine whether the total amount of light received is less than the threshold value; obtain the first voltage signal and the second voltage signal according to the total amount of light received when the total amount of light received is less than the threshold value; apply the first voltage signal to the first liquid crystal components 110 to adjust the focal position of the first light A1 to the photosensitive parts AA, and apply the second voltage signal to the second liquid crystal components 120 to the focal position of the second light A2 to the photosensitive parts AA.

It should be noted that FIG. 3 illustrates an example where the total amount of light received is less than the threshold value. When the total amount of light received is less than the threshold value, the focal positions of the first light A1 and the second light A2 are adjusted to the photosensitive parts AA to increase the light efficiency of the image sensor assembly 20.

Optionally, the processing assembly 30 is specifically configured to obtain a third voltage signal according to the total amount of light received when the total amount of light received is greater than or equal to a threshold value, and apply the third voltage signal to the first liquid crystal components 110 so that the distance H between the focal position of the first light A1 and the liquid crystal lens assembly 10 is greater than or less than the distance h between the liquid crystal lens assembly 10 and the image sensor assembly 20.

Alternatively, a fourth voltage signal is obtained according to the total amount of light received, and the fourth voltage signal is applied to the second liquid crystal components 120 so that the distance H between the focal position of the second light A2 and the liquid crystal lens assembly 10 is greater or less than the distance h between the liquid crystal lens assembly 10 and the image sensor assembly 20.

Alternatively, a third voltage signal and a fourth voltage signal are obtained according to the total amount of light received, and the third voltage signal is applied to the first liquid crystal components 110, and the fourth voltage signal is applied to the second liquid crystal components 120, so that the distances H between the focal positions of the first light A1 and the second light A2 and the liquid crystal lens assembly 10 are greater than or less than the distance h between the liquid crystal lens assembly 10 and the image sensor assembly 20.

In specific implementation, according to the embodiment of the present disclosure, since the focal position of the first light and/or the second light is adjusted so that the distance H between the focal position of the first light A1 and/or the second light A2 and the liquid crystal lens assembly 10 is greater or less than the distance h between the liquid crystal lens assembly 10 and the image sensor assembly 20, the convergence effect of the liquid crystal lens assembly 10 on the first light A1 and the second light A2 thus can be reduced, thereby reducing the light efficiency of the image sensor assembly 20.

It should be noted that FIGS. 4 to 8 all illustrate examples where the total amount of light received is greater than or equal to the threshold value. According to the embodiments of the present disclosure, when the total amount of light received of the image sensor assembly within the threshold time period exceeds the threshold value, the processing assembly adjusts the voltage signal applied to the first liquid crystal components 110 and/or the second liquid crystal components 120, so that the focal position of the first light A1 and/or the second light A2 is far away from the photosensitive parts AA, thereby reducing the light efficiency of the image sensor assembly and further improving the dynamic range of the image sensor assembly. It should be noted that the change process between any two of FIGS. 3 to 8 is a continuous process.

It should be noted that FIG. 4 illustrates an example where the processing assembly 30 obtains the third voltage signal according to the total amount of light received, and applies the third voltage signal to the first liquid crystal components 110, so that the distance H between the focal position of the first light A1 and the liquid crystal lens assembly 10 is greater than the distance h between the liquid crystal lens assembly 10 and the image sensor assembly 20. It should be noted that the third voltage signal can also be adjusted so that the distance H between the focal position of the first light A1 and the liquid crystal lens assembly 10 is less than the distance h between the liquid crystal lens assembly 10 and the image sensor assembly 20.

It should be noted that FIG. 5 illustrates an example where the processing assembly 30 obtains the fourth voltage signal according to the total amount of light received, and applies the fourth voltage signal to the second liquid crystal components 120, so that the distance H between the focal position of the second light A2 and the liquid crystal lens assembly 10 is greater than the distance h between the liquid crystal lens assembly 10 and the image sensor assembly 20. It should be noted that the fourth voltage signal can also be adjusted so that the distance H between the focal position of the second light A2 and the liquid crystal lens assembly 10 is less than the distance h between the liquid crystal lens assembly 10 and the image sensor assembly 20.

It should be noted that FIG. 6 illustrates an example where the processing assembly 30 obtains the third voltage signal and the fourth voltage signal according to the total amount of light received, applies the third voltage signal to the first liquid crystal components 110 and applies the fourth voltage signal to the second liquid crystal components 120, so that the distances H between the focal positions of the first light A1 and the second light A2 and the liquid crystal lens assembly 10 are both greater than the distance h between the liquid crystal lens assembly 10 and the image sensor assembly 20. According to the light path diagram of the imaging device provided in FIG. 6, by increasing the distances H between the focal positions of the first light A1 and the second light A2 and the liquid crystal lens assembly 10, the convergence effect of the liquid crystal lens assembly 10 on the first light A1 and the second light A2 is reduced, the light spot(s) formed by the first light and the second light irradiating the image sensor assembly 20 will become larger, only the energy of the light irradiating the photosensitive parts AA is collected, and the light efficiency of the image sensor assembly 20 will decrease; in this case, the light efficiency of the image sensor assembly 20 is equal to (the area of the photosensitive parts AA/the spot area of the first light+the area of the photosensitive parts AA/the spot area of the second light)/2.

FIG. 7 illustrates an example where the distances H between the focal positions of the first light A1 and the second light A2 and the liquid crystal lens assembly 10 are less than the distance h between the liquid crystal lens assembly 10 and the image sensor assembly 20. According to the light path diagram of the imaging device provided in FIG. 7, by decreasing the distances H between the focal positions of the first light A1 and the second light A2 and the liquid crystal lens assembly 10, the convergence effect of the liquid crystal lens assembly 10 on the first light A1 and the second light A2 is reduced, the light spot(s) formed by the first light A1 and the second light A2 irradiating the image sensor assembly 20 will become larger, only the energy of the light irradiating the photosensitive parts AA is collected, and the light efficiency of the image sensor assembly 20 will decrease; in this case, the light efficiency of the image sensor assembly 20 is equal to (the area of the photosensitive parts AA/the spot area of the first light+the area of the photosensitive parts AA/the spot area of the second light)/2.

It should be noted that FIG. 8 illustrates an example where the distance H between the focal position of one of the first light A1 and the second light A2 and the liquid crystal lens assembly 10 is less than the distance h between the liquid crystal lens assembly 10 and the image sensor assembly 20, and the distance H between the focal position of the other light and the liquid crystal lens assembly 10 is greater than the distance h between the liquid crystal lens assembly 10 and the image sensor assembly 20. According to the light path diagram of the imaging device provided in FIG. 8, since the convergence effect of the liquid crystal lens assembly 10 on the first light A1 and the second light A2 is reduced, the light spot(s) formed by the first light A1 and the second light A2 irradiating the image sensor assembly 20 will become larger, and only the energy of the light irradiating the photosensitive parts AA is collected; in this case, the light efficiency of the image sensor assembly 20 is equal to (the area of the photosensitive parts AA/the spot area of the first light+the area of the photosensitive parts AA/the spot area of the second light)/2.

The working method of the imaging device provided by the embodiments of the present disclosure is further described below, and the specific description is as follows.

In the initial stage of imaging, the total amount of light received of the image sensor assembly 20 within the threshold time period is obtained, a first voltage signal and a second voltage signal are obtained according to the total amount of light received, the first voltage signal is applied to the first liquid crystal components 110 to adjust the focal position of the first light A1 to the photosensitive parts AA, the second voltage signal is applied to the second liquid crystal components 120 to adjust the focal position of the second light A2 to the photosensitive parts AA, and whether the total amount of light received is less than a threshold value. When the total amount of light received is less than the threshold value, the first voltage signal and the second voltage signal are obtained according to the total amount of light received, the first voltage signal is applied to the first liquid crystal components 110, and the second voltage signal is applied to the second liquid crystal components 120, so that the focal positions of the first light A1 and the second light A2 are continuously adjusted to the photosensitive parts AA. When the total amount of light received is greater than or equal to the threshold value, a third voltage signal is obtained according to the total amount of light received and the third voltage signal is applied to the first liquid crystal components 110, so that the distance between the focal position of the first light A1 and the liquid crystal lens assembly 10 is greater or less than the distance between the liquid crystal lens assembly 10 and the image sensor assembly 20; alternatively, a fourth voltage signal is obtained according to the total amount of light received and the fourth voltage signal is applied to the second liquid crystal components 120, so that the distance between the focal position of the second light A2 and the liquid crystal lens assembly 10 is greater or less than the distance between the liquid crystal lens assembly 10 and the image sensor component 20; alternatively, a third voltage signal and a fourth voltage signal are obtained according to the total amount of light received, the third voltage signal is applied to the first liquid crystal components 110, and the fourth voltage signal is applied to the second liquid crystal components 120, so that the distances between the focal positions of the first light and the second light and the liquid crystal lens assembly 10 are greater or less than the distance between the liquid crystal lens assembly 10 and the image sensor assembly 20.

Figure 10:
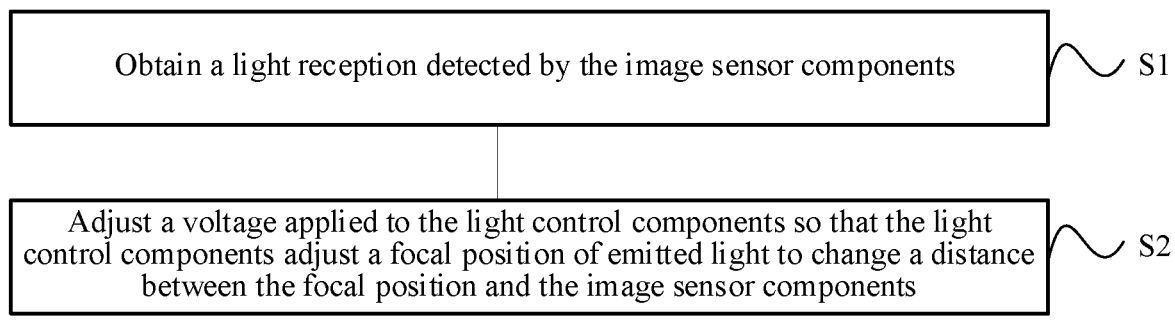
FIG. 10 is a flowchart of an imaging control method provided by an embodiment of the present disclosure.

Based on the same disclosed concept, some embodiments of the present disclosure also provide an imaging control method, which should be configured in the aforementioned imaging device. FIG. 10 is a flowchart of the imaging control method provided by an embodiment of the present disclosure. As shown in FIG. 10, the imaging control method further provided by the embodiment of the present disclosure specifically includes the following steps.

In step S1, an amount of light received detected by the image sensor components is obtained; in specific implementation, the total amount of light received within a threshold time period can be obtained according to the amount of light received by the image sensor assembly at each moment.

Optionally, the threshold time period may be any time range, which is not limited in the embodiments of the present disclosure, and is specifically determined according to actual conditions.

In step S2, a voltage applied to the light control components is adjusted so that the light control components adjust a focal position of emitted light to change a distance between the focal position and the image sensor components. In specific implementation, the voltage signal can be obtained according to the total amount of light received and applied to the liquid crystal lens assembly to adjust the focal position of the light emitted by the liquid crystal lens assembly.

The imaging control method provided in the embodiments of the present disclosure should be configured in the imaging device provided in the foregoing embodiments, and its implementation principles and effects are similar, and will not be repeated here.

Optionally, step S2 of the imaging control method provided by the embodiment of the present disclosure includes the following steps.

Step S21, determining whether the total amount of light received in the threshold time period is less than a threshold value.

Step S22, generating a first voltage signal and a second voltage signal when it is determined that the total amount of light received is less than the threshold value.

Step S23, applying the first voltage signal to the first liquid crystal components to adjust the focal position of a first light to the photosensitive parts, and applying the second voltage signal to the second liquid crystal components to adjust the focal position of a second light to the photosensitive parts, wherein the first light and the second light are two linearly polarized lights which are converted from external ambient light passing through liquid crystal molecules and the polarization direction of the first light and polarization direction of the second light are perpendicular to each other.

Optionally, step S2 of the imaging control method provided by the embodiment of the present disclosure further includes the following steps.

Step S24, generating a third voltage signal when it is determined that the total amount of light received is greater or equal to the threshold value.

Step S25, applying the third voltage signal to the first liquid crystal components so that the focal position of the first light is at a first set position, wherein a distance between the first set position and the liquid crystal lens assembly is greater than or less than a distance between the liquid crystal lens assembly and the image sensor assembly.

Optionally, step S2 of the imaging control method provided by the embodiment of the present disclosure further includes the following steps.

Step S26, generating a fourth voltage signal when it is determined that the total amount of light received is greater or equal to the threshold value.

Step S27, applying the fourth voltage signal to the second liquid crystal components so that the focal position of the second light is at a second set position, wherein a distance between the second set position and the liquid crystal lens assembly is greater than or less than the distance between the liquid crystal lens assembly and the image sensor assembly.

Optionally, step S2 of the imaging control method provided by the embodiment of the present disclosure further includes the following steps.

Step S28, generating a third voltage signal and a fourth voltage signal when it is determined that the total amount of light received is greater or equal to the threshold value.

Step S29, applying the third voltage signal to the first liquid crystal component and applying the fourth voltage signal to the second liquid crystal components so that the focal position of the first light is at a first set position and the focal position of the second light is at a second set position, wherein a distance between the first set position and the liquid crystal lens assembly is greater than or less than a distance between the liquid crystal lens assembly and the image sensor assembly, and a distance between the second set position and the liquid crystal lens assembly is greater than or less than the distance between the liquid crystal lens assembly and the image sensor assembly.

Optionally, in some embodiments of the present disclosure, before step 1, that is, before obtaining the amount of light received detected by the image sensor components, the method further includes: step S0, adjusting a voltage applied to the light control components so that the focal position of emitted light of the light control components is located at the photosensitive parts of the image sensor components.

Based on the same concept of the disclosure, embodiments of the present disclosure further provide an electronic apparatus, including: an imaging device.

The imaging device here may be the imaging device provided in the foregoing embodiments, and its implementation principles and effects are similar, and will not be repeated here.

Based on the same concept of the disclosure, some embodiments of the present disclosure further provide a readable medium, wherein a computer program that can be run on a processor is stored thereon, and the computer program is executed by the processor to implement the steps of an imaging control method.

The imaging control method here may be the imaging control method provided in the foregoing embodiments, and its implementation principles and effects are similar, and will not be repeated here.

The drawings of the embodiments of the present disclosure only refer to the structures involved in the embodiments of the present disclosure, and other structures can refer to the conventional designs.

Although the implementation manners disclosed in the present disclosure are as above, the content described is only the implementation manners used to facilitate the understanding of the present disclosure, and is not intended to limit the present disclosure. Anyone skilled in the art to which this disclosure belongs, without departing from the spirit and scope disclosed in the present disclosure, can make any modifications and changes in the implementation form and details, but the scope of patent protection of present disclosure still be subject to the scope defined by the appended claims.

What is claimed is:

1. An imaging device, comprising:
   an image sensor assembly, comprising a plurality of image sensor components distributed in an array;
   an liquid crystal lens assembly, located on a light incident side of the image sensor assembly, and provided with light control components corresponding to the image sensor components;
   wherein each of the light control components comprises:
      a first liquid crystal component and a second liquid crystal component which are disposed oppositely with each other, and the orientation of the liquid crystal molecules in the first liquid crystal component and the orientation of the liquid crystal molecules in the second liquid crystal component are perpendicular to each other; and
   a processing assembly, electrically connected with both the image sensor assembly and the liquid crystal lens assembly and configured to obtain an amount of light received by the image sensor components, adjust a voltage applied to the light control components according to the amount of light so that the light control components adjust a focal position of emitted light to change a distance between the focal position and the image sensor components;
   wherein the processing assembly is further configured to:
   determine whether the total amount of light received within a threshold time period is less than a threshold value;
   generate a first voltage signal and a second voltage signal in the condition that it is determined that the total amount of light received is less than the threshold value; and
   apply the first voltage signal to the first liquid crystal components to adjust the focal position of a first light to the photosensitive parts, and apply the second voltage signal to the second liquid crystal components to adjust the focal position of a second light to the photosensitive parts, wherein the first light and the second light are two linearly polarized lights which are converted from external ambient light passing through the liquid crystal molecules and the polarization direction of the first light and polarization direction of the second light are perpendicular to each other.

2. The imaging device according to claim 1, wherein the first liquid crystal component comprises: a first substrate, a second substrate opposite to the first substrate, a first control electrode located on a side of the first substrate facing the second substrate, and a first common electrode located on a side of the second substrate facing the first substrate; and the second liquid crystal component comprises: a third substrate, a fourth substrate opposite to the third substrate, a second control electrode located on a side of the third substrate facing the fourth substrate, and a second common electrode located on a side of the fourth substrate facing the third substrate.

3. The imaging device according to claim 2, wherein an orthographic projection of the first control electrode on the first substrate coincides with an orthographic projection of the second control electrode on the first substrate.

4. The imaging device according to claim 3, wherein each of the image sensor components comprises a fifth substrate, a photosensitive part located on the fifth substrate, and a peripheral part surrounding the photosensitive part; and the orthographic projection of the first control electrode on the first substrate covers an orthographic projection of the photosensitive part on the first substrate.

5. The imaging device according to claim 2, wherein the processing assembly is a central processing unit, a field programmable logic array, a digital signal processor, or a single-chip microcomputer.

6. The imaging device according to claim 3, wherein the processing assembly is a central processing unit, a field programmable logic array, a digital signal processor, or a single-chip microcomputer.

7. The imaging device according to claim 4, wherein the processing assembly is a central processing unit, a field programmable logic array, a digital signal processor, or a single-chip microcomputer.

8. The imaging device according to claim 1, wherein the processing assembly is a central processing unit, a field programmable logic array, a digital signal processor, or a single-chip microcomputer.

9. An electronic apparatus, comprising the imaging device according to claim 1.

10. A control method for an imaging device, wherein the imaging device comprises: an image sensor assembly, comprising a plurality of image sensor components distributed in an array; an liquid crystal lens assembly, located on a light incident side of the image sensor assembly, and provided with light control components corresponding to the image sensor components; wherein each of the light control components comprises: a first liquid crystal component and a second liquid crystal component which are disposed oppositely with each other, and the orientation of the liquid crystal molecules in the first liquid crystal component and the orientation of the liquid crystal molecules in the second liquid crystal component are perpendicular to each other; and a processing assembly, electrically connected with both the image sensor assembly and the liquid crystal lens assembly;

wherein the control method comprises:

obtaining, by the processing assembly, an amount of light received by image sensor components; and adjusting, by the processing assembly, a voltage applied to the light control components according to the amount of light so that the light control components adjust a focal position of emitted light to change a distance between the focal position and the image sensor components;

the adjusting, by the processing assembly, the voltage applied to the light control components according to the amount of light so that the light control components adjust the focal position of the emitted light further comprises:

determining, by the processing assembly, whether the total amount of light received within a threshold time period is less than a threshold value;

generating, by the processing assembly, a first voltage signal and a second voltage signal in the condition that it is determined that the total amount of light received is less than the threshold value; and applying, by the processing assembly, the first voltage signal to the first liquid crystal components to adjust the focal position of a first light to the photosensitive parts, and applying, by the processing assembly, the second voltage signal to the second liquid crystal components to adjust the focal position of a second light to the photosensitive parts, wherein the first light and the second light are two linearly polarized lights which are converted from external ambient light passing through the liquid crystal molecules and the polarization direction of the first light and polarization direction of the second light are perpendicular to each other.

11. The imaging device according to claim 1, wherein the processing assembly is further configured to:

generate a third voltage signal in the condition that it is determined that the total amount of light received is greater or equal to the threshold value; and apply the third voltage signal to the first liquid crystal components so that the focal position of the first light is at a first set position, wherein a distance between the first set position and the liquid crystal lens assembly is greater than or less than a distance between the liquid crystal lens assembly and the image sensor assembly.

12. The imaging device according to claim 1, wherein the processing assembly is further configured to:

generate a fourth voltage signal in the condition that it is determined that the total amount of light received is greater or equal to the threshold value; and apply the fourth voltage signal to the second liquid crystal components so that the focal position of the second light is at a second set position, wherein a distance between the second set position and the liquid crystal lens assembly is greater than or less than the distance between the liquid crystal lens assembly and the image sensor assembly.

13. The imaging device according to claim 1, wherein the processing assembly is further configured to:

generate a third voltage signal and a fourth voltage signal in the condition that it is determined that the total amount of light received is greater or equal to the threshold value; and apply the third voltage signal to the first liquid crystal component and apply the fourth voltage signal to the second liquid crystal components so that the focal position of the first light is at a first set position and the focal position of the second light is at a second set position, wherein a distance between the first set position and the liquid crystal lens assembly is greater than or less than a distance between the liquid crystal lens assembly and the image sensor assembly, and a distance between the second set position and the liquid crystal lens assembly is greater than or less than the distance between the liquid crystal lens assembly and the image sensor assembly.

14. The imaging device according to claim 1, wherein the processing assembly is further configured to:

adjust a voltage applied to the light control components so that the focal position of emitted light of the light control components is located at the photosensitive parts of the image sensor components, before obtaining the amount of light received by the image sensor components.

15. A non-transitory readable medium, wherein a computer program that can be run on a processor is stored thereon, and the computer program is executed by the processor to implement steps of the imaging control method according to claim 10.

16. The method according to claim 10, wherein the adjusting, by the processing assembly, the voltage applied to the light control components according to the amount of light so that the light control components adjust the focal position of the emitted light further comprises:
generating, by the processing assembly, a third voltage signal in the condition that it is determined that the total amount of light received is greater or equal to the threshold value; and
applying, by the processing assembly, the third voltage signal to the first liquid crystal components so that the focal position of the first light is at a first set position, wherein a distance between the first set position and the liquid crystal lens assembly is greater than or less than a distance between the liquid crystal lens assembly and the image sensor assembly.

17. The method according to claim 10, wherein the adjusting, by the processing assembly, the voltage applied to the light control components according to the amount of light so that the light control components adjust the focal position of the emitted light further comprises:
generating, by the processing assembly, a fourth voltage signal in the condition that it is determined that the total amount of light received is greater or equal to the threshold value; and
applying, by the processing assembly, the fourth voltage signal to the second liquid crystal components so that the focal position of the second light is at a second set position, wherein a distance between the second set position and the liquid crystal lens assembly is greater than or less than the distance between the liquid crystal lens assembly and the image sensor assembly.

18. The method according to claim 10, wherein the adjusting, by the processing assembly, the voltage applied to the light control components according to the amount of light so that the light control components adjust the focal position of the emitted light further comprises:
generating, by the processing assembly, a third voltage signal and a fourth voltage signal in the condition that it is determined that the total amount of light received is greater or equal to the threshold value; and
applying, by the processing assembly, the third voltage signal to the first liquid crystal component and applying, by the processing assembly, the fourth voltage signal to the second liquid crystal components so that the focal position of the first light is at a first set position and the focal position of the second light is at a second set position, wherein a distance between the first set position and the liquid crystal lens assembly is greater than or less than a distance between the liquid crystal lens assembly and the image sensor assembly, and a distance between the second set position and the liquid crystal lens assembly is greater than or less than the distance between the liquid crystal lens assembly and the image sensor assembly.

19. The method according to claim 10, wherein before the obtaining, by the processing assembly, the amount of light received by the image sensor components, the method further comprises:
adjusting, by the processing assembly, a voltage applied to the light control components so that the focal position of emitted light of the light control components is located at the photosensitive parts of the image sensor components.

* * * * *